United States Patent [19]

Laval, Jr.

[11] 4,147,630

[45] Apr. 3, 1979

[54] HYDRAULIC SEPARATING DEVICE WITH AUTOMATIC FLOW CONTROL

[76] Inventor: Claude C. Laval, Jr., 2444 North Farris Ave., Fresno, Calif. 93705

[21] Appl. No.: 834,408

[22] Filed: Sep. 19, 1977

[51] Int. Cl.[2] .......................... B01D 21/26; B04C 5/04

[52] U.S. Cl. ...................................... 210/137; 55/204; 55/459 R; 210/512 R

[58] Field of Search ................. 55/203, 204, 457, 459; 209/211; 210/84, 137, 304, 512 R; 137/843

[56] References Cited

U.S. PATENT DOCUMENTS

| | | | |
|---|---|---|---|
| 2,179,919 | 11/1939 | Carr et al. | 210/84 X |
| 2,518,084 | 8/1950 | Smith | 209/211 |
| 2,912,999 | 11/1959 | Kersh | 137/843 X |
| 3,276,592 | 10/1966 | Neuman | 210/512 R X |
| 3,684,093 | 8/1972 | Kono et al. | 210/84 |
| 3,947,364 | 3/1976 | Laval, Jr. | 210/84 X |

*Primary Examiner*—Charles N. Hart
*Assistant Examiner*—Richard W. Burks
*Attorney, Agent, or Firm*—Huebner & Worrel

[57] ABSTRACT

An hydraulic separating device with automatic flow control having an outer member providing a passage circumscribed by a surface of revolution; an inner member mounted concentrically in the passage circumscribed by a surface of revolution and with the outer member defining an annular passage therebetween; means for directing fluid in a swirling action through the passage to centrifuge heavier constituents therefrom; and a frusto-concial flap mounted on the inner member in circumscribing relation thereto, the flap extended in converging relation toward the outer member in the direction of the fluid flow therethrough and being resiliently flexible toward and from said outer member.

10 Claims, 6 Drawing Figures

HYDRAULIC SEPARATING DEVICE WITH AUTOMATIC FLOW CONTROL

BACKGROUND OF THE INVENTION

1. Field of the Invention:

The present invention relates to an hydraulic separating device with an automatic flow control, and more particularly to such a device for separating particulate matter from a carrier fluid, the device effectively performing such separation over a relatively wide range of fluid flow rates while minimizing the pressure drop in fluid passing through the device at higher flow rates.

2. Background of the Invention

The prior art includes a variety of cyclonic or vortexing separating devices. Such devices separate particulate matter from a carrier fluid by inducing movement of the fluid and particulate matter in a swirling path within a vortexing chamber. The swirling path is typically induced in a cylindrical chamber by positioning a fluid inlet in tangential relation thereto. The particulate matter is displaced outwardly within the vortexing chamber by centrifugal force and then descends from the main body of the fluid. Since the centrifugal forces developed by the swirling fluid vary with the rotational velocity, it can be seen that at low rotational velocities the particulate matter is not effectively thrown outwardly but passes through the separator with the main body of the carrier fluid.

This failure of separation at low rotational velocities causes great difficulties in the provision of practical cyclonic separators since each conformation of conventional separators is only adapted to a relatively narrow range of flow rates. At flow rates below this narrow range, separation of the particulate matter is unsatisfactory. At higher flow rates, while separation may be achieved, extremely high pressure drops occur with resulting waste of the energy required to pump or draw the fluid through the separator. Also, at higher flow rates rapid wear occurs to elements of the separator exposed to the rapidly swirling particulate matter which is often sand or some other abrasive material.

Because of the narrow range of flow rates for which a single conventional cyclonic separator is suitable, it has not heretofore been possible to provide a separator which is satisfactory for use with fluid systems having a wide range of flow rates. With such systems, either or both of the extremes of insufficient separation and excessive pressure drop have been present. Systems having intermittent fluid flow also present difficulties. Although full flow may be within the range of a separator, some period of time is required for the velocity to build up each time the flow is initiated resulting in poor or no separation during such periods. Even if all fluid systems had a steady flow rate there would be an economic penalty because of the narrow range of a given separator configuration. This is because a wide range of separator configurations is required to handle the wide range of flow rates found in practice with the attendant manufacturing and inventory costs necessary to provide these configurations.

Various forms of cyclonic separators have been proposed to overcome or minimize the limited range of flow rates which effectively can be handled by a single cyclonic separator configuration. One such successful form is disclosed in my U.S. Pat. No. 3,568,837. However, even this form of separator is subject to certain difficulties which the present invention has overcome.

SUMMARY OF THE INVENTION

It is an object of the present invention to provide an improved hydraulic separating device having an automatic flow control.

Another object is to provide such a device which effectively separates particulate matter from a carrier fluid over a wide range of flow rates of the fluid through the separator.

Another object is to provide such a device which can accommodate a wide range of flow rates without excessive pressure drop at the higher flow rates.

Another object is to provide such a device which automatically maintains fluid rotational velocity for continuity of separation over a wide range of flow rates through the separator.

Another object is to provide such a device which can be utilized with a variety of cyclonic separator configurations.

Another object is to provide such a device which is resistant to abrasion and to blockage by particulate matter.

Another object is to provide such a device which is fully effective with intermittent and with rapidly fluctuating flow rates of a carrier fluid.

Another object is to provide such a device in which a single configuration thereof is capable of handling a wide range of flow rates of the carrier fluid.

Another object is to minimize inventory requirements by increasing the range of fluid flow rates accommodated by a separator of a given size.

Further objects and advantages are to provide improved elements and arrangements thereof in an hydraulic separating device which is economical to manufacture, dependable, and fully effective in performing its intended purposes.

DESCRIPTION OF THE PREFERRED EMBODIMENT

First Form

Figure 1:
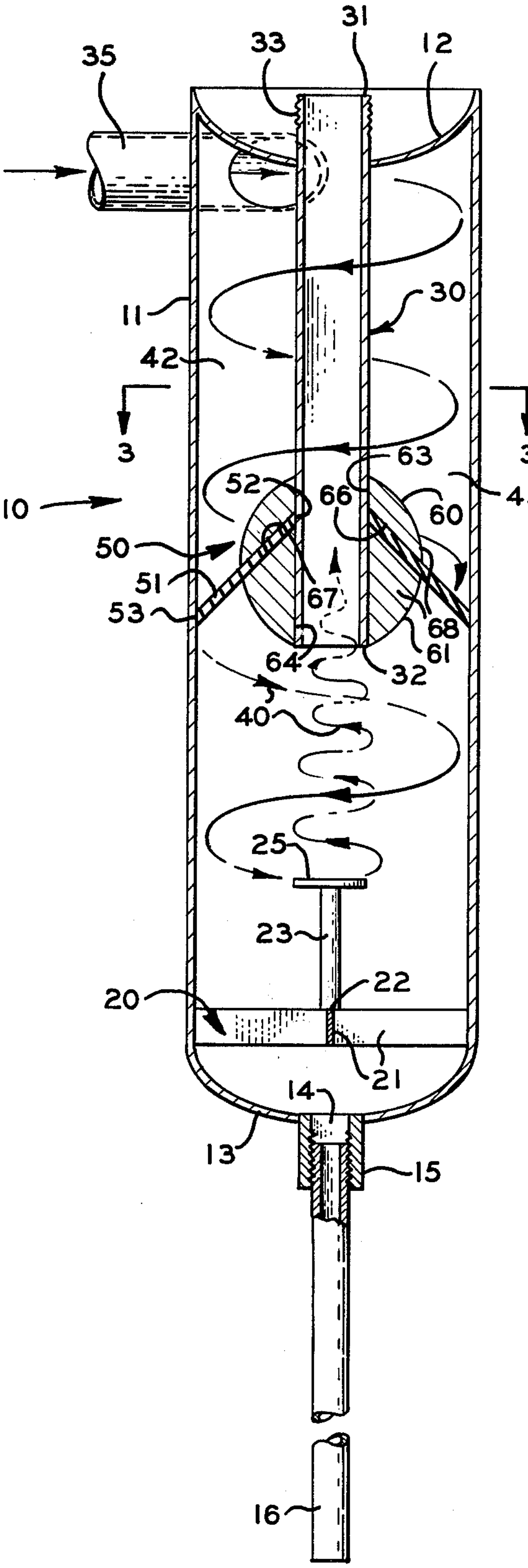
FIG. 1 is a vertical section of an hydraulic separating device embodying a first form of the present invention.

Referring more particularly to the drawings, a first form of hydraulic separating device embodying the principles of the present invention is shown at 10 in FIG. 1. As shown, the device has an outer cylindrical member or tubular housing 11 having a substantially vertical axis. The axis may be inclined, if desired. The upper end of the outer member is closed by an upwardly concave, fractionally spherical cover 12 of sheet material. The lower end of the outer member is closed by an upwardly concave, fractionally spherical closure 13 which as a production convenience is identical to the cover 12. The cover and closure are fixed to the outer member 11 in any convenient manner, as by welding. The closure has an axial cleaning opening 14, circumscribed by a coupling 15 to which a length of tail pipe 16 is connected. Alternatively, a plug or valve, not shown, can be connected to the coupling 15 in place of the tail pipe 16.

The separating device has a cross-shaped bracket 20 upwardly adjacent to the closure 13. The bracket has a plurality of arms 21 extending radially inwardly from the cylindrical outer member 11 to a common junction 22 centrally of the outer member. A tubular support 23 extends upwardly from the junction concentrically with the outer member to an upper end substantially above the closure. A discoidal reaction plate 25 is fixed on the upper end of the tubular support. The reaction plate is substantially smaller in diameter than the outer member and is concentrically related thereto. The structure and operation of such a reaction plate are disclosed in the applicant's U.S. Pat. No. 3,512,651 issued on May 19, 1970. The reaction plate and its support 23 are not essential to the practice of the present invention but, may be helpfully employed in connection therewith.

The separating device 10 has a vortex finder 30 in the form of an inner cylindrical member mounted on the cover 12 concentrically within the outer cylindrical member 11. The vortex finder extends from an open upper end 31 just downward of the upper end of the outer member through the cover to an open lower end 32. The lower end axially is conveniently positioned in relation to the outer member approximately midway between the cover and reaction plate 25. The upper end of the inner member is provided with male screw threads 33 for attachment of an outlet conduit, not shown, to receive fluid which has been substantially separated from particulate matter by the separating device.

Figure 2:
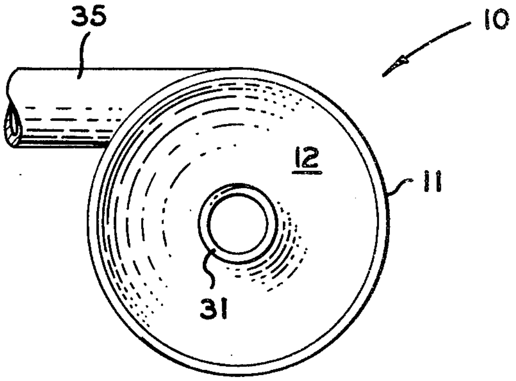
FIG. 2 is a plan view of the separating device of FIG. 1.

The separating device 10 has a transversely disposed inlet conduit 35 mounted on and opening into the upper end portion of the outer cylindrical member 11. The axis of the inlet conduit, as shown in FIGS. 1 and 2, is disposed tangentially to the axis of the outer member toward the periphery thereof and somewhat below the cover 12. The inlet conduit is connected to a source, not shown, of fluid laden with particulate matter. Flow of fluid from the inlet conduit, through the separating device, and from the upper end 31 of the inner cylindrical member 30 can be induced in any suitable manner such as by connecting the inlet conduit 35 to the discharge of a pump or the vortex finder 30 to the suction side of a pump.

Figure 3:
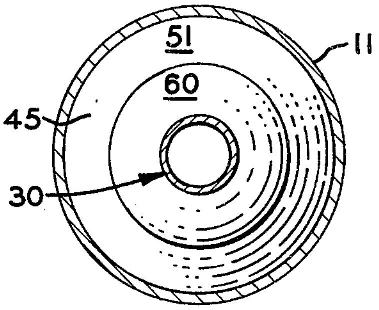
FIG. 3 is a horizontal section of the separating device taken on line 3—3 of FIG. 1.

Since the inlet conduit 35 is tangentially related to the outer cylindrical member 11, fluid entering the separating device is given a swirling or vortexing movement in a path, indicated by the arrow 40, within the outer member. A vortexing chamber 42 is thus defined within the outer member. As best shown in FIG. 3, the outer cylindrical member 11 and the inner cylindrical member 30 define an annular passage 45 through the vortexing chamber for the swirling path of the fluid.

The hydraulic separating device 10, as best shown in FIG. 1, is provided with a first form of automatic velocity control apparatus, indicated generally by the numeral 50. The apparatus includes a resiliently flexible flap 51 of frusto-conical shape mounted concentrically on the inner cylindrical member 30 toward the lower end 32 thereof. The flap has an inner circular opening 52 fitted to the inner member, and extends radially obliquely therefrom in the direction of fluid flow so that the periphery 53 of the flap engages, or is closely adjacent to, the inner surface of the outer cylindrical member 11 when there is no fluid flowing.

The flap 51 is secured to the inner cylindrical member 30 by an upper collar 60 and a lower collar 61 which are rigidly mounted on the inner member, as by welding, with the flap clamped therebetween. The upper and lower collars have respective central bores, 63 and 64, which are fitted to the inner member. The upper collar has a lower frusto-conical surface 66 fitted to the upper surface of the flap, and the lower collar has an upper frusto-conical surface 67 fitted to the lower surface of the flap. The peripheries of the collars are formed so that, when they are fitted to the inner member of the flap, the collars form a sphere 68 mounted concentrically on the inner member adjacent to the lower end 32 thereof and extended toward the outer member 11. The sphere is substantially smaller in diameter than the outer cylindrical member so that the annular passage 45 extends around the sphere. The flap extends obliquely downwardly from the sphere in circumscribing relation thereto into the annular passage at a position where the passage is restricted by the sphere.

It is to be understood that the automatic flow control apparatus 50 can be utilized with any separating device 10 having an outer and an inner member, corresponding to the members 11 and 30, so as to define an annular passage, corresponding to the passage 45, therebetween. The apparatus can be utilized with any suitable device for inducing swirling or vortexing flow in the annular passage, and is not restricted to use with a tangential inlet such as the conduit 35. The flow conntrol apparatus is also not restricted to use with a reaction plate 25, although such use is advantageous, or to the particular form of cover 12, closure 13 or discharge conduit 16.

Second Form

Figure 4:
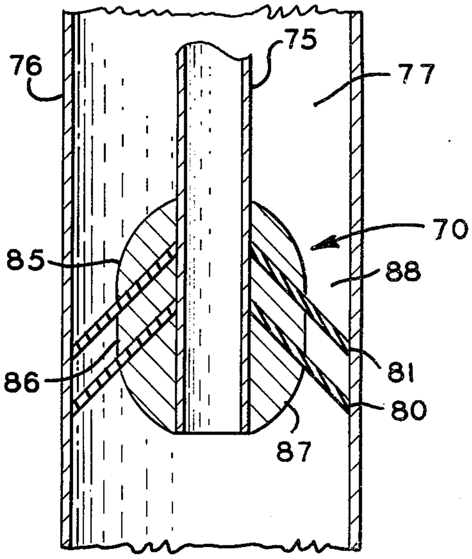
FIG. 4 is a fragmentary vertical section of a separating device embodying a second form of the present invention.

A second form of flow control apparatus of the present invention, indicated generally by the numeral 70, is shown in FIG. 4. The apparatus is shown mounted on an inner cylindrical member 75, corresponding to the vortex finder 30, concentrically related to an outer cylindrical member 76, corresponding to the outer member 11, which has a vortexing chamber 77 therebetween, corresponding to the vortexing chamber 42.

The second form 70 of the present invention has a lower frusto-conical flap 80 of resiliently flexible material mounted concentrically on the inner member 75 and substantially identical to the flap 51 of the first form 50 of the present invention. The lower flap extends obliquely radially from the inner member in the direction of fluid flow. The second form has an auxiliary flap 81 substantially identical to the flap 80 and mounted in upwardly spaced, parallel relation thereto concentrically on the inner member. An upper collar 85, substantially identical to the upper collar 60 of the first form 50, engages the auxiliary flap upwardly thereof. A central collar 86 maintains the flaps 80 and 81 in spaced relation. The central collar has a cylindrical periphery and frusto-conical upper and lower surfaces respectively fitted to the lower surface of the auxiliary flap and the upper surface of the lower flap. A lower collar 87, substantially identical to the lower collar 11 of the first form, engages the lower collar downwardly thereof.

The collars 85, 86, and 87 are fixed to the inner member in clamping relation to the flaps 80 and 81, as by welding. An annular passage 88 extends past the flaps when they are flexed downwardly and inwardly.

Third Form

Figure 5:
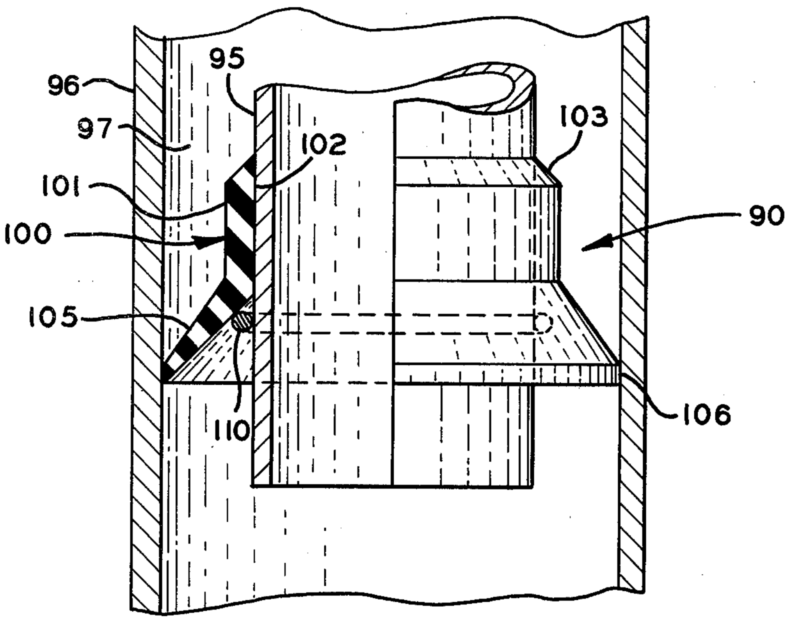
FIG. 5 is a fragmentary vertical section of a separating device embodying a third form of the present invention with a portion thereof shown in elevation for illustrative convenience.
Figure 6:
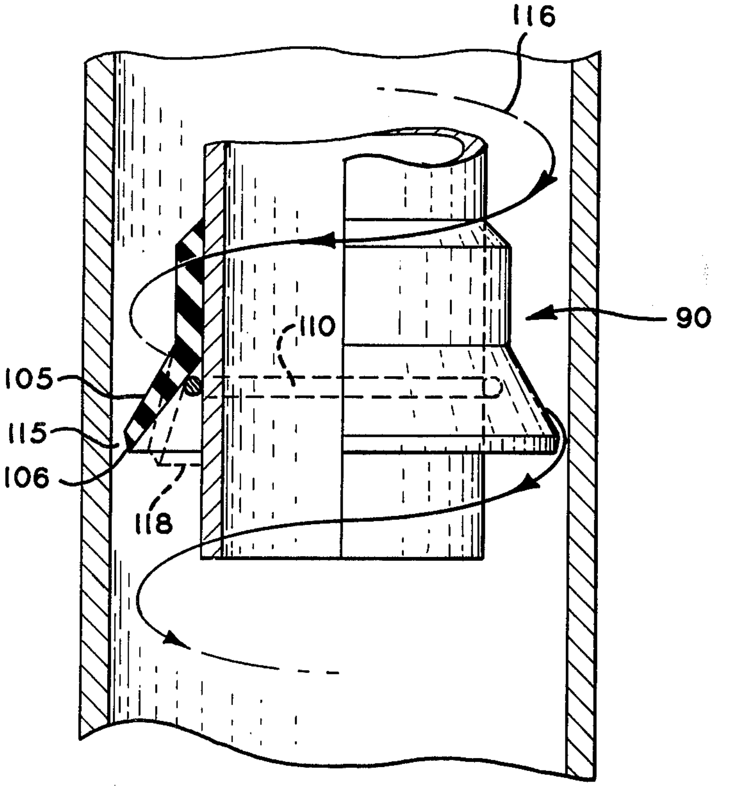
FIG. 6 is a vertical section partially in elevation similar to FIG. 5 but showing a flap of the third form in a flexed position with an alternative flexed position shown in dashed lines.

A third form of control apparatus of the present invention is indicated by the numeral 90 in FIGS. 5 and 6. The apparatus is shown mounted on an inner cylindrical member 95 concentrically related to an outer cylindrical member 96 which has a vortexing chamber 97 therebetween. The inner member, outer member and chamber are substantially identical to the corresponding elements in the first and second forms.

The third form 90 has an annular unitary flap and mounting assembly 100 of resiliently flexible material mounted concentrically on the inner cylindrical member. The assembly has a sleeve 101 providing a cylindrical inner surface 107 fitted to the inner cylindrical member 95 and a beveled upper end 103. The assembly has a frusto-conical flap 105 integral therewith extending radially and downwardly from the lower end of the sleeve to a cylindrical outer edge 106 fitted to the inner surface of the outer cylindrical member 96 or closely adjacent thereto. The flap is preferably outwardly tapered to provide desirable bending characteristics.

The third form of apparatus 90 includes a circular stop 110, preferably of toroidal construction, fitted about the inner cylindrical member 75 and engaging the assembly 100 oppositely of the sleeve 101. The stop is fixed to the inner member and retains the assembly 100 thereon as by welding.

Since the stop 110 is of toroidal form, the flap 105 can resiliently flex over the curved surface of the stop, as shown in FIG. 6. The flap is urged into a flexed position, as shown in FIG. 6, by the impact of the vortexing fluid in the chamber 97. As a result, an annulus 115 is developed between the outer end 106 of the flap and the outer member 11 through which the vortexing fluid flows in a path indicated by the arrow 116. An alternate flexed position of the flap due to even greater impact of fluid on the flap at higher flow rates is indicated by the numeral 118.

If desired, a plurality of flap and mounting assemblies 100 can be mounted in spaced relation on the inner cylindrical member 95 to provide an automatic flow control apparatus similar to the second form 70 of the present invention.

OPERATION

The operation of the described embodiments of the present invention is believed to be clearly apparent and is briefly summarized at this point. A fluid laden with particulate matter is caused to enter the separating device 10 at the inlet conduit 35 by a pressure differential applied between the inlet conduit 35 and the upper end 31 of the inner cylindrical member 30. A suitable pressure differential is, typically, created by connecting the upper end to the suction of a pump or by connecting the inlet conduit to the discharge of a pump. As previously described, and shown in FIG. 1, the fluid swirls within the vortexing chamber 42 in a path indicated by the arrows 40. The centrifugal force created by the swirling movement urges the particulate matter outwardly toward the outer cylindrical member 11 for descent into the closure 13 and tail pipe 16. The swirling fluid continues to move downwardly past the lower end 32 of the inner cylindrical member whereupon, aided by the reaction plate 25 and while continuing its swirling motion, the fluid reverses its downward movement while continuing to swirl in the same direction and flows upwardly within the vortex member. When the velocity of the fluid is sufficient, the centrifugal separation is continued as the fluid swirls upwardly further removing particulate matter from the fluid. The purified fluid then exits from the separating device through the vortex finder. When employed in a well or the separator is otherwise submerged, the heavier particulate matter settles in the outer cylindrical member 11 and out the tail pipe 16. By employing a tail pipe of sufficient length, there is no influx of water in through the opening 14. If the separator is employed above ground, a plug, not shown, is mounted in the coupling 15 and the particulate matter simply collected in the closure 13.

The above described manner of separation is of course only effective if the volume of fluid through the separating device is sufficient to maintain the velocity of the fluid through the annular passage 45 at a level sufficient to effect the centrifuging. At lower flow rates through the passage insufficient centrifugal force is developed to throw the particulate matter outwardly. Under such circumstances, particulate matter is carried directly from the inlet conduit 35 to the lower end 32 of the vortex finder 30 and separation does not occur. However, by utilizing a flow control apparatus 50, 70, or 90 of the present invention, the velocity of the fluid through the annular passage is automatically maintained at a relatively high level as the volume of fluid flowing through the separating device decreases. The velocity is maintained by the flaps 51, 80, 81, and 105 which act so as effectively to reduce the area of the annular passage as the flow decreases.

Referring to FIG. 1, when there is no fluid flow through the separator, the flap 51 extends outwardly to engage, or closely approach, the outer cylindrical member 11.

If fluid flow inwardly through the inlet 35 is induced for swirling passage downwardly through the outer member 11 in the manner described, the pressure differential on opposite sides of the flap 51 causes the flap to flex downwardly and inwardly dilating the annular passage thereby. The greater the flow rate, the greater the flexing and the larger the passage to accomodate it. On the other hand, if the influx of fluid through the inlet 35 decreases, the resilience of the flap in view of te decreased pressure differential causes the flap to move upwardly and outwardly constricting the passage past the flap to maintain a fast velocity to insure centrifuging swirling action even with reduced volume of fluid.

The operation of the second form of the invention shown in FIG. 4 is substantially the same. With no fluid flow, the flaps 80 and 81 remain in their outer positions engaging, or closely approaching the outer member 76. As fluid is caused to swirl downwardly through the annular passage between the vortex finder 75 and the outer member 76, the vanes 80 and 81 flex downwardly and inwardly to dilate said passage. As such flow decreases, the flaps move outwardly and upwardly to constrict the passage to insure the maintenance of high velocity centrifuging. Increased flow is automatically accommodated by flexing of the flaps downwardly and inwardly.

The flap 105 of the third form of the invention is mounted differently from those of the first two forms of the invention but operates in substantially the same manner. When there is minimal or no fluid flowing, the flexible flap 105 is urged outwardly by its resilience so that the outer edge 106 engages the inner surface of the outer member 96. As soon as a flow inducing differential pressure is developed across the separating device, a higher pressure develops upwardly of the flap causing it to flex to a position as shown in FIG. 6. Such bending of the flap forms the annulus 115. This annulus is of relatively small area so that the fluid flowing therethrough must move at a velocity high enough for effective separation of particulate matter even though the total volume of fluid is relatively small. As the differential pressure across the separating device increases, a greater volume of fluid is, of course, urged to flow through the device. However, this increased differential pressure also develops a greater force across the flap moving it toward an alternate position such as 118. This increases the area of the annulus outwardly of the flap so that the maximum velocity of the fluid in the vortexing chamber 97 does not increase above that required for separation of particulate matter. As a result, the pressure drop required to produce flow through the separating device does not increase significantly above the pressure drop required for separation at lower flow rates. In the several forms of the invention, the area of the annular passage by the flaps is varied automatically by the impact of the fluid, as developed by the flowing inducing differential pressure across the separating device, on the resilient flap. Since the forces bending the flap are the same as those producing the flow, there is no significant delay in the flap assuming the proper position if the flow is intermittent and/or fluctuating. The present invention, therefore, maintains the fluid velocity causing centrifuging separation at the proper level for effective separation during periods of rapidly increasing or decreasing flow.

Due to the variable cross-sectional area of the annular passages 45, 88 and 115, the velocity of fluid flow therethrough can be maintained at a level which is not greater than that required for effective separation of particulate matter. As a result, the abrasive effect of the particulate matter on the flaps 51, 80, 81 and 100 and the outer members 11, 76 and 96 is kept to a minimum even at relatively high flow rates. If at low flow rates, particulate matter accumulates on the flaps, it is simply flushed away when the flow rate increases. Such flushing is aided by bending of the flaps which tends to break loose layers of material adhering thereto. The minimized wear even at high flow rates together with resistance to blockage at low flow rates reduces the cost of such a device over its lift as compared with prior art devices due to longer life and reduced labor costs.

A single size or configuration of an hydraulic separating device embodying form 50, 70, or 90 of the present invention will, as described, properly separate particulate matter from a fluid over a wide range of fluid flow rates. A single such device can therefore, be provided in a separation installation which would otherwise require a plurality of prior art devices selected by automatic controls or by manually operated valves to handle such a range of flow.

A reduction in cost over prior art separators is possible with the present invention even in installations where steady fluid flow prevails. Only one size or configuration of separating device need be provided to handle a wide range of such flow rates. The cost of an individual separator is thereby reduced due to economies in mass production and reduction of inventory.

Other advantages are inherent in an hydraulic separating device 10 of the configuration shown in FIG. 1 due to the downwardly convex cover 12 adjacent to the inlet conduit 35. Hydraulically, this convexity guides the incoming fluid into the downwardly moving vortex path indicated by the arrow 40. Mechanically, the upward concavity of the cover permits the screw threads 33 to be positioned within the outer cylindrical member 11 for protection prior to installation of the separating device. Such a cover is also economical to construct.

Although the invention has been herein shown and described in what are conceived to be the most practical and preferred embodiments, it is recognized that departures may be made therefrom within the scope of the invention, which is not to be limited to the illustrative details disclosed.

Having described my invention, what I claim as new and desire to secure by Letters Patent is:

1. A separating device comprising:

A. an outer member having an elongated vortexing chamber circumscribed by an inner surface of revolution and having substantially closed upper and lower ends;

B. an elongated tubular inner member mounted in the upper end of the outer member substantially concentrically of the vortexing chamber circumscribed by an outer surface of revolution and with the inner surface of the outer member defining an annular passage therebetween, the inner member having an open end disposed within the vortexing chamber intermediate opposite ends thereof;

C. a fluid supply conduit connected tangentially to the vortexing chamber adjacent to the upper end of the outer member whereby fluid containing matter to be separated therefrom is delivered into the vortexing chamber, swirls about the inner member downwardly in the passage and the vortexing chamber to centrifuge matter therefrom from gravitational descent to the lower end of the outer member and the fluid thence swirls upwardly through the inner member;

D. means for removing matter that has settled to the lower end of the outer member;

E. a resiliently flexible circular flap; and

F. means mounting the flap in circumscribing relation on the inner member below the fluid supply conduit with the flap extended obliquely outwardly and downwardly from the inner member into the passage whereby the effective size of the passage is reduced when the volume of fluid flow is reduced by the flap moving outwardly toward the outer member to maintain fluid velocity for centrifuging purposes and the effective size of the passage is increased when the volume of fluid flow is increased forcing the flap inwardly from the outer member to accommodate the increased volume while maintaining fluid velocity for centrifuging purposes.

2. The separating device of claim 1 in which the mounting means comprises a pair of collars rigidly mounted on the inner member with the flap clamped therebetween.

3. The separating device of claim 1 in which mounting means externally circumscribes the inner member and is extended toward the outer member to constrict the passage.

4. The separating device of claim 3 in which the flap is extended outwardly into the passage at the position where it is constricted by the mounting means.

5. The separating device of claim 1 having:

A. an auxiliary resiliently flexible circular flap, and

B. means mounting the auxiliary flap on the inner member with the auxiliary flap extended obliquely outwardly and downwardly from the inner member into the passage, the flap and the auxiliary flap being in spaced relation longitudinally of the passage.

6. The apparatus of claim 1 in which the flap and mounting means are unitary, the mounting means is a sleeve fitted to the inner member, and the flap is outwardly tapered.

7. The apparatus of claim 6 including a circular stop mounted on the inner member and engaged with the flap opposite to the sleeve and over which the flap resiliently flexes.

8. In a separating device having a substantially cylindrical vortexing chamber having upper and lower ends; a substantially cylindrical vortex finder mounted substantially concentrically in the upper end of the vortexing chamber and downwardly extended therefrom and therewith defining an annular passage circumscribing the vortex finder; means for impelling fluid containing particulate matter tangentially into the upper end of the vortexing chamber to swirl downwardly through the passage to centrifuge particulate matter therefrom and thence upwardly through the vortex finder; and means to remove particulate matter from the vortexing chamber which is centrifuged therein; an automatic control for regulating velocity of the fluid through the passage in response to changes in volume of fluid flow comprising:

A. a frusto-conical flap of resiliently flexible material having an inner diameter fitted to the vortex finder, and B. means mounting the flap on the vortex finder below said impelling means with said flap extended obliquely outwardly and downwardly therefrom in the passage.

9. In combination with a separating device having a substantially cylindrical vortexing chamber having upper and lower ends; a substantially cylindrical tubular vortex finder mounted substantially concentrically in the upper end of the vortexing chamber and downwardly extended therefrom and therewith defining an annular passage circumscribing the vortex finder; means for impelling fluid containing particulate matter tangentially into the upper end of the vortexing chamber to swirl downwardly through the passage to centrifuge particulate matter therefrom and thence upwardly through the vortex finder; and means to remove particulate matter from the vortex chamber which settles therein; an automatic control for regulating velocity of the fluid through the passage in response to changes in volume of fluid flow comprising a frusto-conical flap of resiliently flexible material having an inner diameter mounted in circumscribing relation on the vortex finder below said impelling means and an outer diameter disposed outwardly and downwardly therefrom within the annular passage, said flap flexing outwardly to constrict the passage when the volume of fluid flow through the passage decreases to maintain fluid velocity for centrifuging purposes and flexing inwardly to increase the effective size of the passage when the volume of fluid flow through the passage increases.

10. In a device for separating particulate matter from a carrier fluid, which device has an outer member providing an elongated vortexing chamber circumscribed by an inwardly disposed surface of revolution and substantially closed upper and lower ends; an elongated tubular inner member mounted in the upper end of the outer member substantially concentrically of the vortexing chamber circumscribed by an outwardly disposed surface of revolution and with the inner surface of the outer member defining a passage therebetween, the inner member having an open end disposed within the vortexing chamber intermediate opposite ends thereof; means for supplying a carrier fluid containing particulate matter to be removed therefrom in a fluid stream substantially tangentially to the upper end of the vortexing chamber to swirl about the inner member downwardly in the passage and the vortexing chamber to centrifuge particulate matter therefrom for gravitational descent in the outer member; and means for removing the particulate matter that settles in the outer member; an automatic control for maintaining fluid velocity through the passage for centrifuging purposes comprising:

A. a frusto-conical flap of resiliently flexible material having an inner diameter fitted to the vortex finder below the supplying means and an outer diameter adjacent to the inwardly disposed surface of the outer member; and B. means mounting the flap in circumscribing relation on the inner member extended obliquely outwardly and downwardly therefrom.

* * * * *